(12) United States Patent
Hriljac et al.

(10) Patent No.: US 11,906,189 B2
(45) Date of Patent: Feb. 20, 2024

(54) SYSTEM AND METHOD FOR HIGH VENTILATION OF OUTDOOR AIR

(71) Applicant: Siemens Industry, Inc., Alpharetta, GA (US)

(72) Inventors: Jeffrey Hriljac, Port Barrington, IL (US); Jibo Liu, Long Grove, IL (US); Richard Pope, Woodstock, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 433 days.

(21) Appl. No.: 17/190,904

(22) Filed: Mar. 3, 2021

(65) Prior Publication Data

US 2022/0282886 A1    Sep. 8, 2022

(51) Int. Cl.
| | |
|---|---|
| *F24F 11/77* | (2018.01) |
| *F24F 11/43* | (2018.01) |
| *F24F 7/06* | (2006.01) |
| *F24F 120/00* | (2018.01) |
| *F24F 110/10* | (2018.01) |

(52) U.S. Cl.
CPC ............. *F24F 11/77* (2018.01); *F24F 7/06* (2013.01); *F24F 11/43* (2018.01); *F24F 2110/10* (2018.01); *F24F 2120/00* (2018.01)

(58) Field of Classification Search
CPC .... F24F 11/77; F24F 11/43; F24F 7/05; F24F 2129/00; F24F 2110/10
USPC ........................................................ 700/276
See application file for complete search history.

(56) References Cited

U.S. PATENT DOCUMENTS

| | | | |
|---|---|---|---|
| 10,364,995 B2* | 7/2019 | Fischer | F24F 11/86 |
| 10,670,288 B2* | 6/2020 | Thomle | F24F 11/64 |
| 2006/0150644 A1 | 7/2006 | Wruck | |
| 2010/0320277 A1* | 12/2010 | Stark | F24F 11/77 236/1 B |
| 2011/0046790 A1 | 2/2011 | Miller et al. | |
| 2011/0264273 A1 | 10/2011 | Grabinger et al. | |
| 2011/0264274 A1 | 10/2011 | Grabinger et al. | |
| 2020/0080738 A1* | 3/2020 | Miller | G05D 23/1919 |
| 2021/0199329 A9* | 7/2021 | Mowris | F24F 8/22 |

OTHER PUBLICATIONS

PCT Search Report dated May 19, 2022, for PCT Application PCT/US2022/015724, 13 pages.

* cited by examiner

*Primary Examiner* — Md Azad (57) ABSTRACT

There is described a system and method for high ventilation using outdoor air in an indoor area comprising an HVAC unit and a controller. The HVAC unit includes at least one damper and a fan. The controller detects an activation of an emergency purge mode, adjusts the at least one air damper to allow a maximum of outside air to flow through the HVAC unit without circulating return air, and establishes a fan speed of the fan for maximum outside airflow through the HVAC unit. The controller also modifies the fan speed of the fan based on an occupant comfort criteria without regard to energy efficiency of the HVAC unit. The fan speed is modified based on a delta enthalpy of the HVAC unit and a nominal capacity of the HVAC unit.

17 Claims, 6 Drawing Sheets

SYSTEM AND METHOD FOR HIGH VENTILATION OF OUTDOOR AIR

FIELD OF THE INVENTION

This application relates to the field of environmental control systems and, more particularly, to system operation of fresh air intake components of HVAC units.

BACKGROUND

An environmental control system of a building manages heating, ventilation, and air conditioning (HVAC) components to manage environmental conditions within the building. The environmental control system may include a rooftop unit of an HVAC components to allow fresh air external to the building to circulate through the HVAC components and cool the environmental conditions of the building in an efficient manner. With the existence of pandemic viruses, air quality is a serious and significant concern for building owners and occupants. It is difficult to ensure that return air is minimized during a buildings ventilation cycle and systematically increase the amount of fresh air to the space. Conventional systems are focused on energy efficiency so fresh air was always mixed with return air, which only dilutes contaminants within the air. These conventional systems generally prioritize energy efficiency over air quality, thus failing to directly address issues caused by pandemic viruses and other airbourne concerns.

SUMMARY

In accordance with one embodiment of the disclosure, there is provided a high ventilation approach of outdoor air for building management systems. The approach prioritizes air quality circulated within one or more indoor areas over energy efficiency of the HVAC components. Instead of mixing the outdoor air with return air, the approach focuses on maximizing the circulation of outdoor air throughout the indoor areas so that contaminated air is expelled even though energy consumption of the HVAC components may be higher. In addition, the approach may be scheduled according to the occupants wishes or performed in an on-demand fashion, which will run for a specified time period. Building owners and occupants are provided the ability to expel contaminants when the need arises and not just during modes predetermined by the manufacturer or vendor.

One aspect is a system for high ventilation using outdoor air in an indoor area comprising an HVAC unit and a controller. The HVAC unit includes at least one damper and a fan. The controller detects an activation of an emergency purge mode, adjusts the at least one air damper to allow a maximum of outside air to flow through the HVAC unit without circulating return air, and establishes a fan speed of the fan for maximum outside airflow through the HVAC unit. The controller also modifies the fan speed of the fan based on an occupant comfort criteria without regard to energy efficiency of the HVAC unit. The fan speed is modified, primarily or at least in part, based on a delta enthalpy of the HVAC unit and a nominal capacity of the HVAC unit.

Another aspect is a method for high ventilation of outdoor air in an indoor area. An activation of an emergency purge mode is detected. One or more air dampers of an HVAC unit are adjusted to allow a maximum of outside air to flow through the HVAC unit without circulating return air. A fan speed of a fan of the HVAC unit is established for maximum outside airflow through the HVAC unit. The fan speed of the fan is modified based on an occupant comfort criteria without regard to energy efficiency of the HVAC unit, the fan speed being modified, primarily or at least in part, based on a delta enthalpy of the HVAC unit and a nominal capacity of the HVAC unit.

Yet another aspect is a non-transitory computer readable medium including executable instructions which, when executed, causes at least one processor to provide high ventilation of outdoor air in an indoor area. An activation of an emergency purge mode is detected. One or more air dampers of an HVAC unit are adjusted to allow a maximum of outside air to flow through the HVAC unit without circulating return air. A fan speed of a fan of the HVAC unit is established for maximum outside airflow through the HVAC unit. The fan speed of the fan is modified based on an occupant comfort criteria without regard to energy efficiency of the HVAC unit, the fan speed being modified, primarily or at least in part, based on a delta enthalpy of the HVAC unit and a nominal capacity of the HVAC unit.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate high ventilation of outdoor air for building management systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Contamination by pandemic viruses may be reduced or otherwise managed by controlling temperature, humidity, and/or ultraviolet light of an indoor area. The high ventilation system counters the viruses by exposing higher temperatures, higher humidity, greater ultraviolet light (such as sunlight), and/or maximum ventilation of outside air. Switching to 100% outdoor air operation may cause a cooling and/or heating load of the indoor are to increase significantly, which may or may not be covered by the nominal cooling/heating capacity of the HVAC unit corresponding to the system. Thus, the system includes one or more purge modes for managing the operation, including timing, when operating a maximum outdoor air operation. Also, for some embodiments, the system determines the proper air flow, increasing and decreasing air flow when necessary, to meet both comfort and health requirements.

The system and method expel contaminated air and increase ventilation in buildings to meet both health and comfort requirement for one or more HVAC units having a rooftop unit operating to circulate fresh air. The purge modes of the system and method may be scheduled according to the occupant wishes or performed in an on-demand fashion in which may run the sequence may operate for a specified amount of time. As a result, the building owners and/or occupants have the ability to expel contaminants when the need arises, which may be particularly useful before and after events, as well as during a deep cleaning when occupants are away.

In contrast to conventional systems and features that focus on energy efficiency, the high ventilation system and its emergency purge feature shifts control strategy to operational efficiency which circulates maximum outdoor air (about 100% fresh air) through the indoor area, minimizing the use of any return air. Higher than usual space temperature and humidity setpoints are adjusted to maintain a reasonable comfort level for occupants of the indoor area. Other features of the high ventilation system include operating additional purges when the indoor area is unoccupied, control of free cooling and demand control ventilation ("DCV"), control of exhaust fan operation to maintain correct space static pressure, control of ultraviolet ("UV") light where available, and control of humidifiers where available to maintain space humidity level above a determined threshold.

Figure 1:
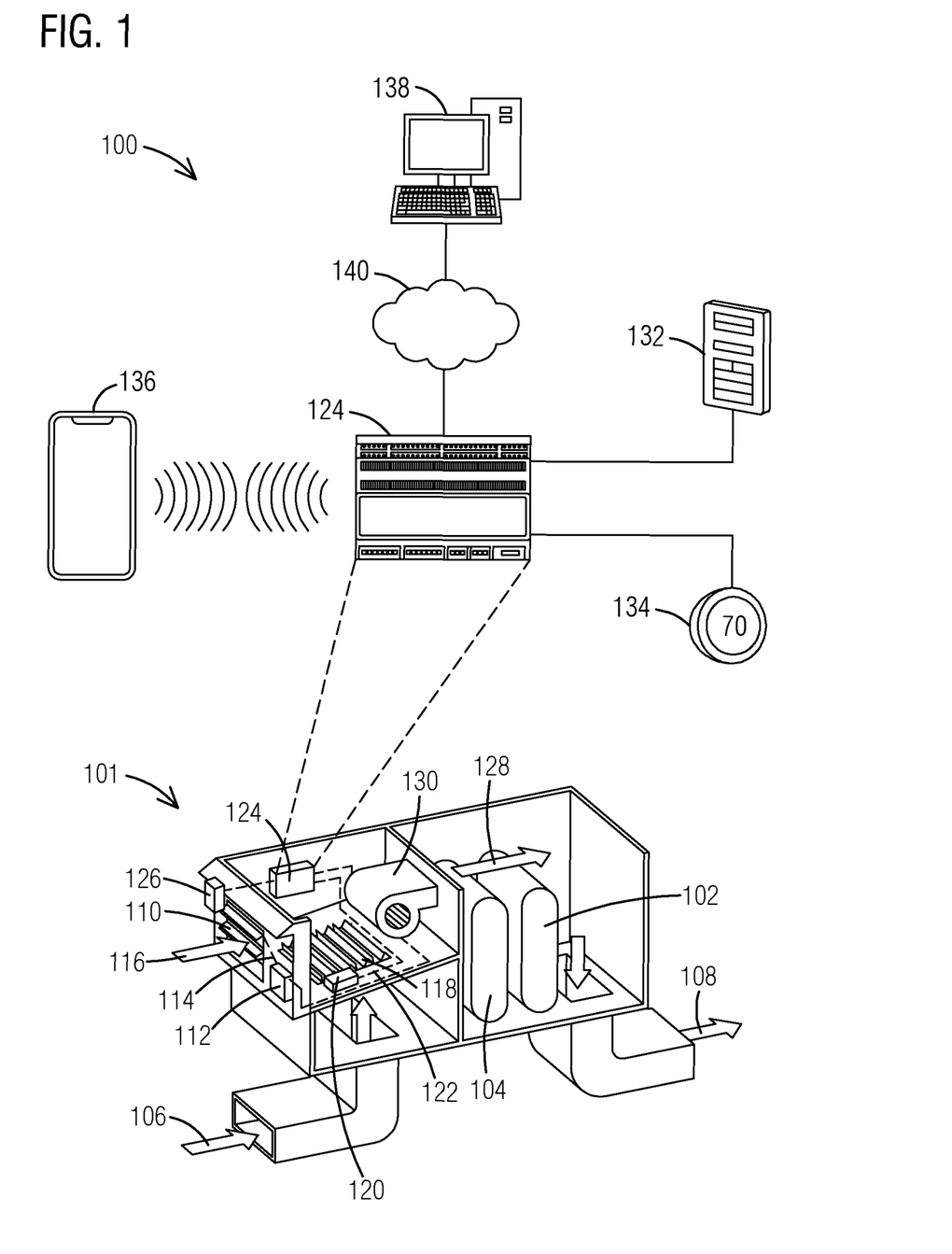
FIG. 1 is an illustration of an environment in an example implementation that is operable to employ techniques described herein.

The HVAC controller 124 may determine proper airflow, according to outdoor conditions, which include modulation of damper and/or fan actuators to meet both comfort and health requirements, as well as safeties to protect the equipment. In particular, the damper(s) may be adjusted, and the fan speed may be driven to maximum in order to flush the indoor air with 100% outdoor air at max air flow, while provide safety protection for the HVAC unit 101. For long term operation, the damper(s) may be used to run the HVAC unit 101 with 100% outdoor air without circulating the return air to stop the spread of hazardous substances and infectious airborne diseases. The combined open and closed loop control may determine proper air flow (thus, fan speed) to meet comfort criteria and/or requirements—an open loop algorithm based on outside air condition as well as the unit nominal cooling/heating capacity can immediately bring the fan speed to a proper point, then a closed loop control will engage to further fine tune the fan speed based on room temperature or discharge air temperature.

Referring to FIG. 1, there is shown an illustration of an environment in an example implementation that is operable to employ techniques described herein, specifically a high ventilation system 100 of outdoor air for an HVAC unit 101. The components of the HVAC unit 101 include heating and/or cooling coils 102, 104 that modify, if necessary, the temperature of return air 106 to generate supply air 108 for the building. The components of the HVAC unit 101 also include an outside air damper 110 controlled by an outside motorized actuator 112 via an outside linkage 114 to manage the amount of outside air 116 entering the system and a return air damper 118 controlled by a return motorized actuator 120 via a return linkage 122 to manage the amount of return air 106 continuing through the system. A HVAC controller 124 of the high ventilation system 100 controls the outside and return motorized actuators 112, 120 based on commands received from controlling devices and/or data received from HVAC sensors 126 to manage air flow 128 circulated through the system. The air flow may include outside air, return air, or a combination of outside and return air. The air flow may be controlled by one or more fans 130 of the HVAC unit 101.

In addition to the HVAC controller 124 and the HVAC unit 101, the high ventilation system 100 further includes one or more controlling devices to command or otherwise provide information to the HVAC controller. Examples of controlling devices include, but are not limited to, a room unit 132, a thermostat 134, a mobile device 136, and a remote device 138 communicating with the HVAC controller 124 via a communication network 140. One or more the controlling devices may also provide remote monitoring and/or intelligence diagnostics services for the HVAC controller 124. For example, the remote device 138 may be a remote monitoring and intelligence diagnostics cloud-based device that allows a user to collect and evaluate equipment data efficiently using IoT analytics tools, including subscription management, performance reporting, and accelerated controller application development.

Figure 2:
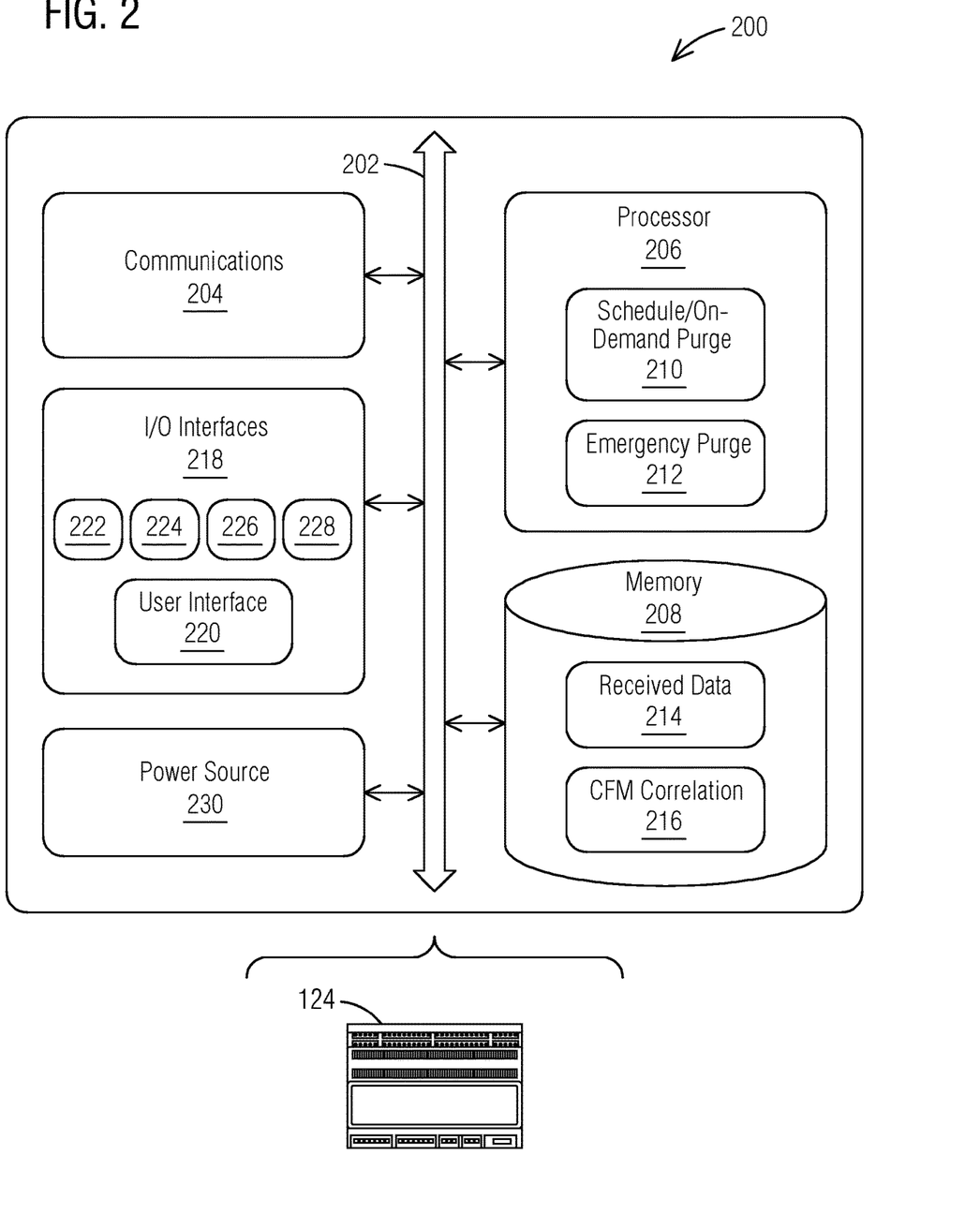
FIG. 2 depicts a block diagram of an HVAC controller of FIG. 1 in an example implementation.

Referring to FIG. 2, there is depicted a block diagram of an HVAC controller 200 in an example implementation. The HVAC controller 200 may be any type of controller that may manage the components of the HVAC unit 101. The HVAC controller 200 comprises a communication bus 202 for interconnecting the other device components directly or indirectly, one or more communication components 204 communicating other entities via a wired and/or wireless network, one or more processors 206, and one or more memory components 208.

The communication component 204 may utilize wireless technology for communication, such as, but are not limited to, cellular-based communications, Bluetooth (including BLE), ultrawide band (UWB), Wi-Fi (including Wi-Fi Direct), IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. The communication component 204 of the HVAC controller 200 may also utilize wired technology for communication, such as transmission of data over a physical conduit, e.g., an electrical cable or optical fiber cable. For example, the HVAC controller 200 may communicate with the mobile device 136 via a wireless link and/or with the room unit 132, thermostat 134, or remote device 138 via a wired link.

The one or more processors 206 may execute code and process data received at other components of the HVAC controller 200, such as information received at the communication component 204 or stored at the memory component 208. The code associated with the high ventilation system 100 and stored by the memory component 208 may include, but is not limited to, operating systems, applications, modules, drivers, and the like. An operating system includes executable code that controls basic functions of the HVAC controller 200, such as interactions among the various components of the HVAC controller, communication with external devices via the communication component 204, and storage and retrieval of code and data to and from the memory component 208. Each application includes executable code to provide specific functionality for the processor 206 and/or remaining components of the HVAC controller 200. Examples of applications executable by the processor 206 include, but are not limited to, a scheduled/on-demand purge module 210 for managing high ventilation purge of contaminants using outdoor air for the HVAC controller 124 based on scheduled or on-demand activations, and an emergency purge module 212 for managing high ventilation purge of contaminants using outdoor air for the HVAC controller 124 based on special circumstances, such as concerns for pandemic viruses.

In addition, the scheduled purge, on-demand purge, and emergency purge, the processor or processors 206 may also control other unit operation modes of the HVAC controller 200. Examples of these other unit operation modes include, but are not limited to, an off mode, a comfort mode, a pre-comfort mode, an economy mode, a protection mode, an emergency condition mode, an anti-freeze mode, a defrost mode. The off mode represents a state in which the HVAC controller 200 and/or corresponding HVAC unit is off. The comfort mode is associated with setpoints and timing of an occupied state of the indoor area. The pre-comfort mode is associated with setpoints and timing of a pre-occupied state of the indoor area (i.e., not occupied but to be occupied by occupants). The economy mode is associated with setpoints and timing of an unoccupied state of the indoor area. The protection mode, also known as "holiday mode", is associated with setpoints and timing in response to extreme high/low space (mixed and/or discharge) temperatures for protection. The emergency condition mode is associated with setpoints and timing in response to a fire, smoke, or other life critical alarm. The anti-freeze mode is associated with setpoints and timing responsive to low coil temperature or low mixed air temperature. The defrost mode is associated with setpoints and timing for an extreme cold state of a heat pump or dual fuel heat pump unit. The above modes may be activated or inactivated based on a manual operation at a controlling device, a schedule set at a controlling device, a signal received from a sensor (such as a presence sensor), or a combination of information received from the controlling device and/or sensor.

Data is information of the memory component 208 that may be referenced and/or manipulated by an operating system or application for performing functions of the HVAC controller 200. Examples of data associated with the high ventilation of outdoor air and stored by the memory component 208 may include, but are not limited to, received data 214 from one or more controlling devices 132-138, and CFM correlation data 216 determined based on the received data.

The HVAC controller 200 may further comprise one or more input and/or output components 218 ("I/O interfaces"). A user interface 220 of the HVAC controller 200 may include portions of the input and/or output components 218 and be used to interact with a user of the HVAC controller. For example, the user interface 220 may include a combination of hardware and software to provide a user with a desired user experience. The input and output components 218 may include other components 222-228 to facilitate high ventilation functions of the system 100, such as interfaced to an HVAC sensor 222, another controller 224, a display 226, an audio alarm 228, and the like.

The HVAC controller 200 may further comprise a power source 230, such as a power supply or a portable battery, for providing power to the other device components of the HVAC controller 200.

It is to be understood that FIG. 2 is provided for illustrative purposes only to represent examples of the internal components of the HVAC controller 200 and is not intended to be a complete diagram of the various components that may be utilized by the device. Therefore, the HVAC controller 200 may include various other components not shown in FIG. 2, may include a combination of two or more components, or a division of a particular component into two or more separate components, and still be within the scope of the present invention.

Figure 3:
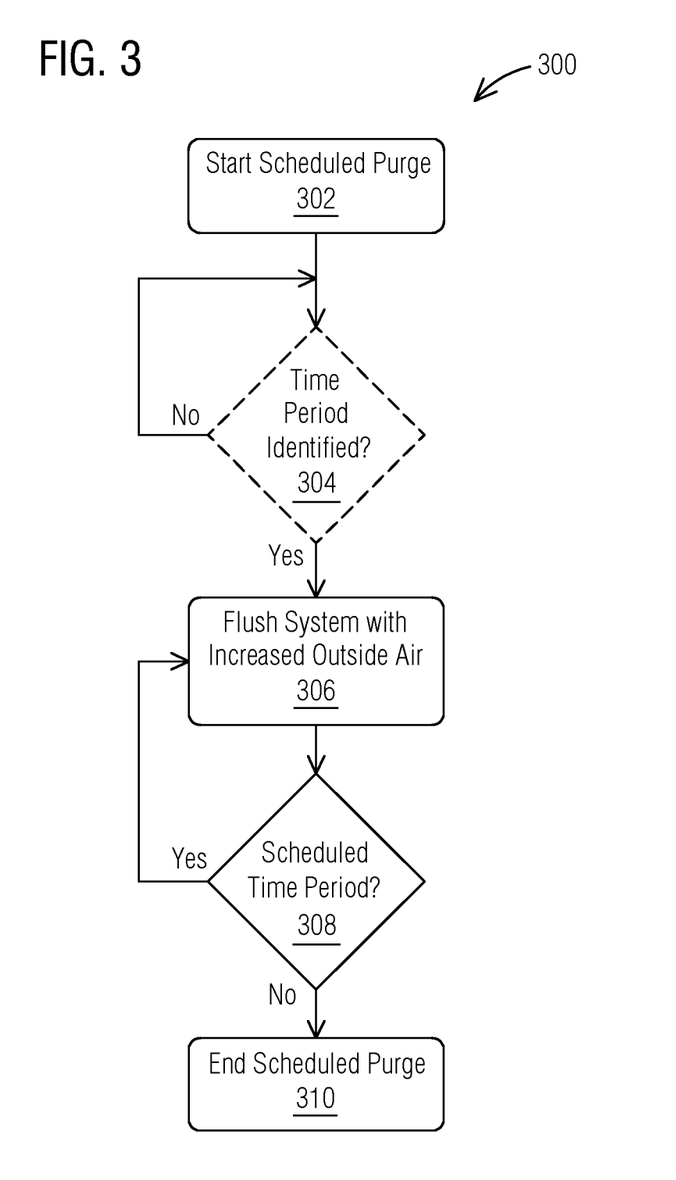
FIG. 3 depicts a flow diagram of a first operation of the HVAC controller of FIG. 1 in an example implementation.

Referring to FIG. 3, there is depicted a flow diagram of a first operation 300 of the HVAC controller 124 in an example implementation, the first operation being a scheduled purge which is a unit operation mode of the HVAC controller (as described above). The first operation 300, i.e., scheduled purge, is activated or otherwise initiated (302) based on a scheduled determined by a controlling device, such as a room unit 132, a thermostat 134, a mobile device 136, and a remote device 138 communicating with the HVAC controller 124 via a communication network 140. For some embodiments, the HVAC controller 124 may check whether the schedule has been determined or is otherwise available (304). The HVAC controller 124 may then perform an operation of flushing the HVAC unit 101 with an increased or high level of outside air (306). The flushing operation is a regular purge, in contrast to the emergency purge described below, which generally increases fresh air circulated throughout the HVAC unit 101. The first operation 300 may continue with flushing the HVAC unit 101 until an end time is reached or a determined time period has expired (308). For example, the schedule of the scheduled purge may specify a particular initiation time and a particular end time for the first operation 300. Thereafter, the first operation 300 may terminate (310).

Figure 4:
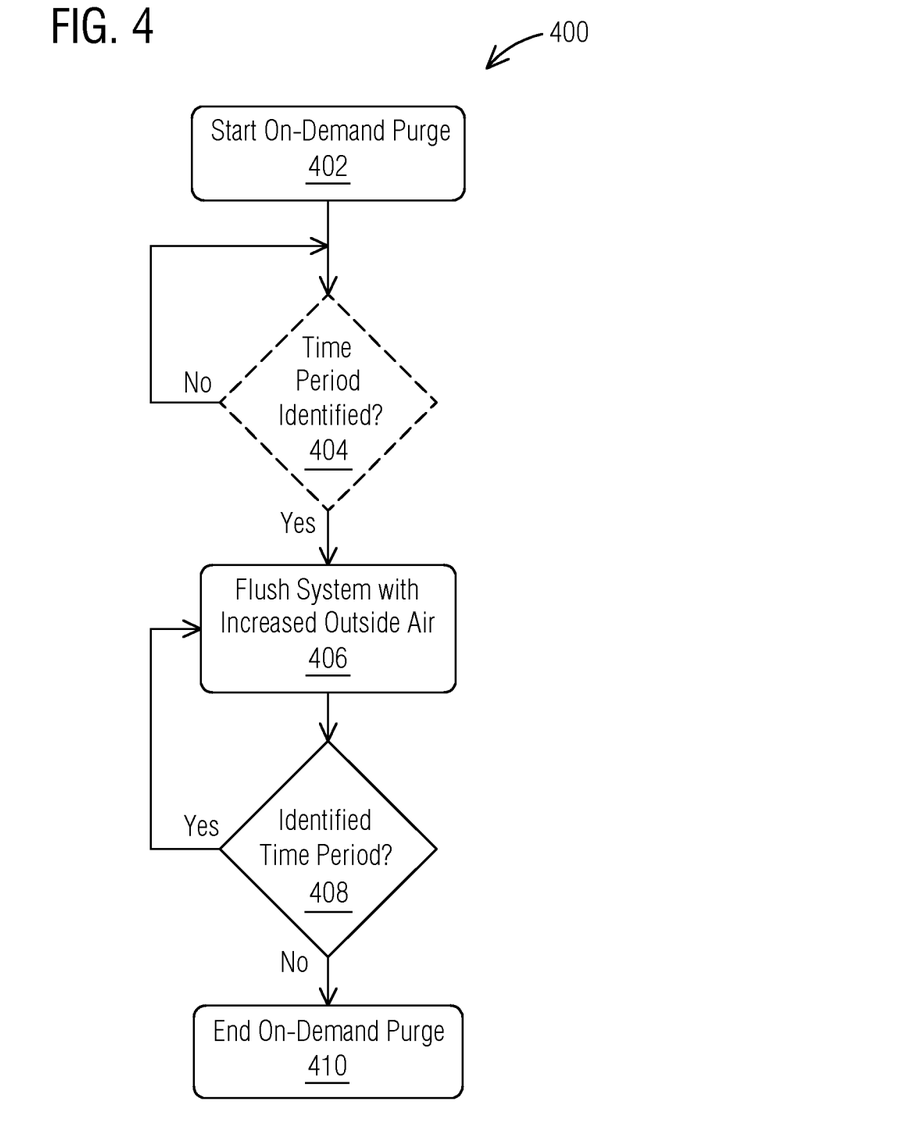
FIG. 4 depicts a flow diagram of a second operation of the HVAC controller of FIG. 1 in an example implementation.

Referring to FIG. 4, there is depicted a flow diagram of a second operation 400 of the HVAC controller in an example implementation, the second operation being a on-demand purge which is a unit operation mode of the HVAC controller (as described above). The second operation 400, i.e., on-demand purge, is activated or otherwise initiated (402) based on an activation provided or otherwise indicated by a controlling device, such as a room unit 132, a thermostat 134, a mobile device 136, and a remote device 138 communicating with the HVAC controller 124 via a communication network 140. For some embodiments, the HVAC controller 124 may check whether a time period has been determined or is otherwise available (404). The HVAC controller 124 may then perform an operation of flushing the HVAC unit 101 with an increased or high level of outside air (406). The flushing operation is a regular purge, in contrast to the emergency purge described below, which generally increases fresh air circulated throughout the HVAC unit 101. The second operation 400 may continue with flushing the HVAC unit 101 until a determined time period has expired or an end time is reached (408). For example, the time period of the on-demand purge may specify a particular duration for the flushing operation in response to, and relative to, the start of the flushing operation. Thereafter, the second operation 400 may terminate (410).

Figure 5:
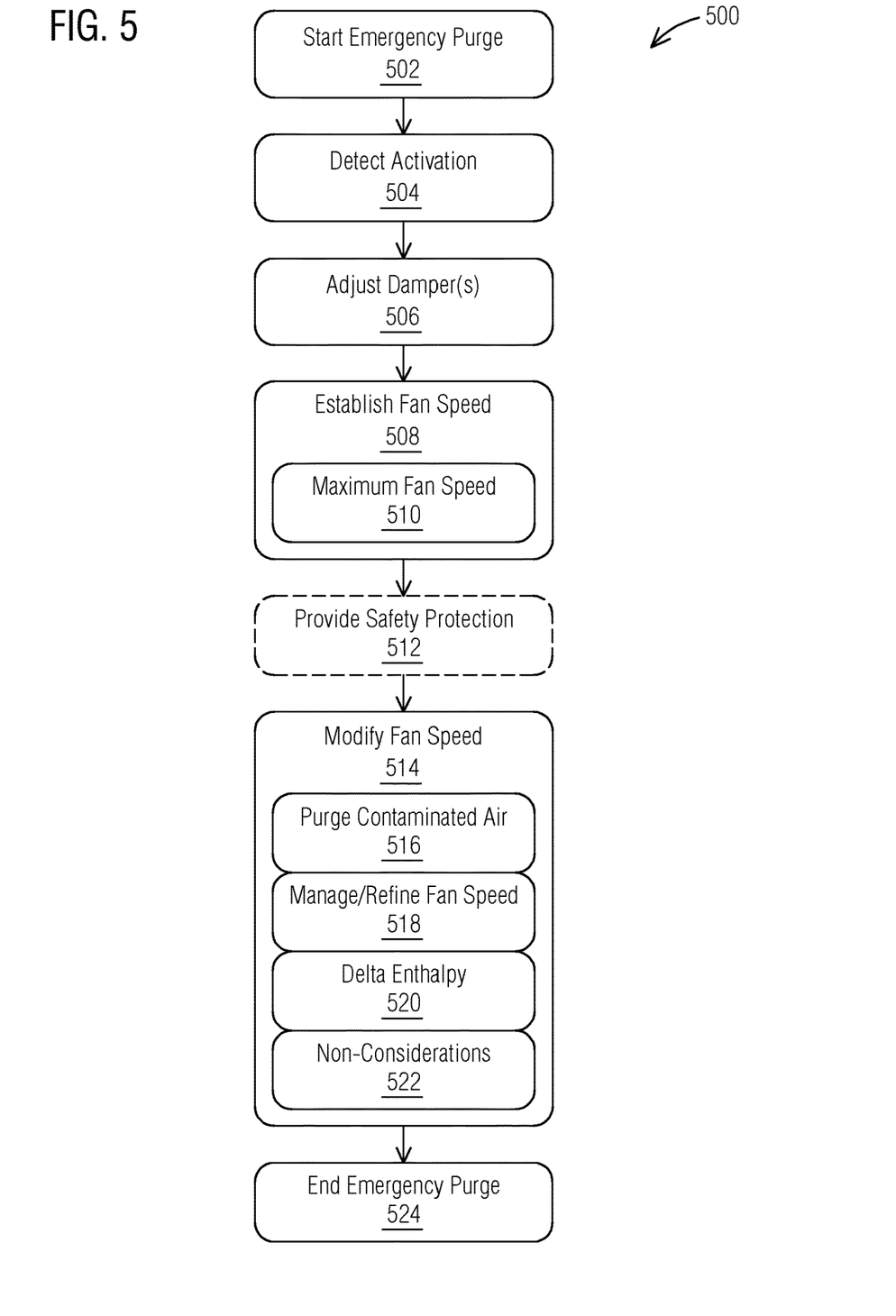
FIG. 5 depicts a flow diagram of a third operation of the HVAC controller of FIG. 1 in an example implementation.

Referring to FIG. 5, there is depicted a flow diagram of a third operation 500 of the HVAC controller in an example implementation, the third operation being an emergency purge for high ventilation of outdoor air in an indoor area. In response to initiating or enabling the third operation 400 (502), the HVAC controller 124 detects an activation of an emergency purge mode (504). The HVAC controller 124 adjusts one or more air dampers of an HVAC unit to allow a maximum of outside air to flow through the HVAC unit without circulating return air (506), in response to detecting the activation of the emergency purge mode (504). Accordingly, the high ventilation system 100 may minimize the spread of hazardous substances and infectious airborne diseases. For some embodiments, the outside motorized actuator 112 is commanded to open the outside air damper 110 to a maximum or substantially maximum position to allow outside air to enter the HVAC unit 101. For some embodiments, the return motorized actuator 120 is commanded to close the return air damper 118 or redirect the return air away from the outside air entering the HVAC unit 101 in order to avoid circulating the return air.

In response to detecting the activation (504) or adjusting the air damper or dampers (506), the HVAC controller 124 establishes an initial fan speed of a fan 130 of the HVAC unit for maximum outside airflow through the HVAC unit 101 (508). For some embodiments, the HVAC controller 124 may drive the fan 130 at a maximum fan speed (510) to flush the indoor air with maximum outdoor air at maximum air flow. For some embodiments, the HVAC controller 124 may provide safety protection for the HVAC unit 101 based on a high mixed/discharge temperature and a low mixed/discharge temperature (512). For example, one or more embodiments of the safety protection may include a freeze protection mode for equipment safety.

After establishing the initial fan speed of the fan 130, modifying the fan speed of the fan 130 based on an occupant comfort criteria without regard to energy efficiency of the HVAC unit (514). The fan speed is modified based on a delta enthalpy of the HVAC unit and a nominal capacity of the HVAC unit. For some embodiments, the HVAC controller 124 modifies the fan speed of the fan 130 in accordance with an occupant comfort criteria while purging contaminated viral air from the indoor area (516). the occupant comfort criteria specifies one or more environmental properties, such as temperature, to maximize occupant comfort during the contaminant purging operation of the high ventilation system 100. For some embodiments, the HVAC controller 124 modifies the fan speed of the fan 130 by managing the fan speed, using an open loop logic, based on the delta enthalpy of the HVAC unit and the nominal capacity of the HVAC unit, and refining the fan speed, using a closed loop logic, based on a room temperature of the indoor area, a discharge air temperature of the HVAC unit, or both (518).

As stated above, the HVAC controller 124 modifies the fan speed based on a delta enthalpy of the HVAC unit and a nominal capacity of the HVAC unit, for example in British thermal units. For some embodiments, the delta enthalpy is based on a difference between a discharge air enthalpy of the HVAC unit and an outside air enthalpy of the HVAC unit (520). For example, the delta enthalpy may be DA enthalpy (setpoint)—OA enthalpy (present) and may be based on: airflow (per cubic feet per minute)=nominal capacity (in BTU)/delta enthalpy/predetermined constant (4.5). For some embodiments, the delta enthalpy does not take humidification of the HVAC unit into consideration. Humidification may result in no change in the enthalpy but may result in higher humidity and lower temperature.

As an example, for a testing unit may having a nominal heating capacity of 205000 BTU/HR, the high static fan may provide nominal air flow of 6250 cfm. For this example, the nominal delta enthalpy shall be 205000/6250/4.5=7.3 BTU/LB at fan high speed. If the fan operates at low speed, the delta enthalpy shall be 205000/6250/4.5*1.5=12.0 BTU/LB, which indicate the HVAC unit 101 is able to supply a similar amount of BTU with a higher discharge temperature.

In cold weather, such as OAT=35 DegF and H.Rel=20%, the emergency purge may be enabled to maintain a reasonable discharge air temperature to be the same as the regular operation, and the delta enthalpy shall be 14.5 BTU/LB. Thus, the air flow shall be reduced to 50%. If a 2-speed fan is utilized, the discharge temperature will be 85 DegF at low speed (67% CFM), so occupant comfort criteria may be difficult to meet. When humidifier is activated, the discharge temperature shall be lower. To maintain same comfort level, the CFM shall be even smaller, in this case, when the combined humidification demand 35% of CFM is more reasonable.

The operation of the high ventilation system adapts to the varying conditions of the annual seasons. In winter, we are faced with challenges of combating viruses which require more heating capacity than usual. In very cold weather, it may be difficult to meet both comfort and heath criteria at same time due to the high ventilation demand of these pandemic situations, so the high ventilation system 100 reduces fan speed to reduce the heating load. In addition to comfort and health, the high ventilation system 100 also addresses equipment safety, i.e., freeze protection. For example, for an anti-freeze condition, the HVAC controller 124 may reduce the fan speed to ⅓ of total CFM or minimum ventilation CFM whichever is greater. When the anti-freeze condition no longer exists, the fan speed may return to its pre-anti-freeze condition, such as ⅔ of the total CFM. During summer months, the HVAC unit 101 experiences less stress in supplying high temperature air and high humidity air is in accordance with energy-saving. In summer, the unconditioned, hot, and humid outside air may be better than the winter air to combat the viral conditions so the mechanical cooling of the HVAC unit may serve purely for comfort demand.

Figure 6:
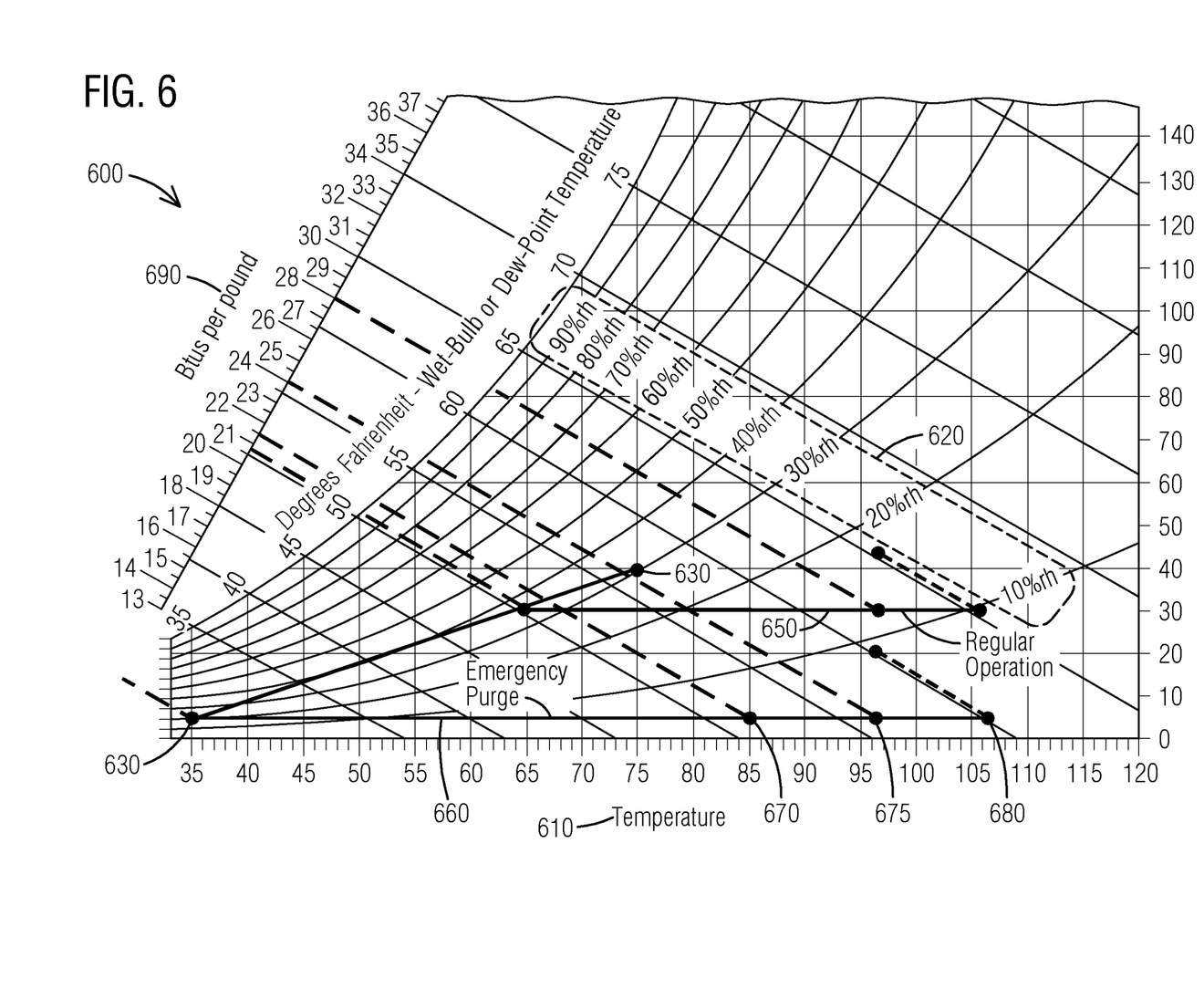
FIG. 6 depicts a psychrometric chart of the third operation of the HVAC controller of FIG. 5 in an example implementation.

Referring to FIG. 6, there is depicted a psychrometric chart 600 of the third operation of the HVAC controller in an example implementation, illustrating a determination of proper air flow (CFM) with an open loop algorithm. The psychrometric chart 600 illustrates multiple scenarios for determining the proper air flow, thus the appropriate fan speed, for the HVAC unit 101. The x-axis 610 of the chart 600 represents temperature levels, and the curved lines 620 extending from the lower left and moving up toward the upper right represent humidity. A first point 630 represents an indoor area having a temperature of 75 degrees and a humidity of 30%. For the example illustrated by FIG. 6, a second point 640 may represent outside conditions of 35 degrees in temperature and 20% humidity. For regulation operation of the HVAC unit 101, a regular operation line 650 may represent regular operations in which mixed air, which includes return air, may control the temperature and humidity of the indoor area while maintaining efficient power consumption. For the high ventilation operation of the high ventilation system 100, a high ventilation operation line 660 represents the contamination purging and fresh air ventilation in which maximum outdoor air, without return air, may control the temperature of the indoor area while maintaining comfort of the occupants. As shown in FIG. 6, the psychrometric chart 600 includes data points, namely fourth, fifth, and sixth points 670, 675, 680, to represent example settings of the discharge measurements or setpoints of the high ventilation operation line 660. When computing the enthalpy, represented by angled axis 690, of the discharge air measurements or setpoints along the high ventilation operation line 660 to the outdoor air measurements, such as the first point 630, the HVAC controller 124 may determine the delta enthalpy of the HVAC unit 101 and modify the fan speed based on the delta enthalpy and the nominal capacity of the HVAC unit.

The high ventilation system 100 may be managed, by for example the processor or processors 206 of the system, using an open loop control or a combined mode of the open loop control and a closed loop control. The open loop control may generally determine the appropriate air flow for the HVAC unit 101 to maximize occupant comfort during emergency purge. The BTU control may quickly respond to emergency purge to place the fan speed to a proper value. For embodiments that include the closed loop control, the closed loop control may further refine the determination of the open loop control to improve precision. For example, when there is a static bias, then a space temperature based incremental PID may kick-in to correct the static bias. Thus, BTU control as a primary loop may act fast, while the incremental PID as a secondary loop may enhance the determination. For some embodiments, an open-loop table of CFM against OAT-OAH based on experimental data may be utilized handle these types of scenarios. The OAT and OAH may be acquired from a cloud service in where physical sensor is not available, or choose whichever is more reliable if both cloud service and physical OA sensor are available.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for high ventilation using outdoor air in an indoor area comprising:
   an HVAC unit including at least one damper and a fan; and
   a controller configured to detect an activation of an emergency purge mode, adjust the at least one air damper to allow a maximum of outside air to flow through the HVAC unit without circulating return air, establish a fan speed of the fan for maximum outside airflow through the HVAC unit, and modify the fan speed of the fan based on an occupant comfort criteria,
   wherein the fan speed is modified, at least in part, based on a delta enthalpy of the HVAC unit and a nominal capacity of the HVAC unit, and
   wherein the controller manages the fan speed, using an open loop logic, based on the delta enthalpy of the HVAC unit and the nominal capacity of the HVAC unit; and the controller refines the fan speed, using a closed loop logic, based on at least one of a room temperature of the indoor area or a discharge air temperature of the HVAC unit.

2. The system as described in claim 1, wherein the controller drives the fan at a maximum fan speed.

3. The system as described in claim 1, wherein:
   the controller provides safety protection for the HVAC unit based on a high mixed/discharge temperature and a low mixed/discharge temperature; and
   the safety protection including a freeze protection mode for equipment safety.

4. The system as described in claim 1, wherein the controller causes the HVAC unit to purge contaminated viral air from the indoor area.

5. The system as described in claim 1, wherein the delta enthalpy is based on a difference between a discharge air enthalpy of the HVAC unit and an outside air enthalpy of the HVAC unit.

6. The system as described in claim 1, wherein the delta enthalpy does not take humidification of the HVAC unit into consideration.

7. A method for high ventilation of outdoor air in an indoor area, the method comprising:
   detecting an activation of an emergency purge mode;
   adjusting at least one air damper of an HVAC unit to allow a maximum of outside air to flow through the HVAC unit without circulating return air;
   establishing a fan speed of a fan of the HVAC unit for maximum outside airflow through the HVAC unit; and
   modifying the fan speed of the fan based on an occupant comfort criteria, the fan speed being modified, at least in part, based on a delta enthalpy of the HVAC unit and a nominal capacity of the HVAC unit, wherein modifying the fan speed of the fan includes:
      managing the fan speed, using an open loop logic, based on the delta enthalpy of the HVAC unit and the nominal capacity of the HVAC unit; and
      refining the fan speed, using a closed loop logic, based on at least one of a room temperature of the indoor area or a discharge air temperature of the HVAC unit.

8. The method as described in claim 7, wherein establishing the fan speed of the fan of the HVAC unit includes driving the fan at a maximum fan speed.

9. The method as described in claim 7, further comprising providing safety protection for the HVAC unit based on a high mixed/discharge temperature and a low mixed/discharge temperature, wherein the safety protection including a freeze protection mode for equipment safety.

10. The method as described in claim 7, wherein modifying the fan speed of the fan includes purging contaminated viral air from the indoor area.

11. The method as described in claim 7, wherein the delta enthalpy is based on a difference between a discharge air enthalpy of the HVAC unit and an outside air enthalpy of the HVAC unit.

12. The method as described in claim 7, wherein the delta enthalpy does not take humidification of the HVAC unit into consideration.

13. A non-transitory computer readable medium including executable instructions which, when executed, causes at least one processor to provide high ventilation of outdoor air in an indoor area by:
   detecting an activation of an emergency purge mode;
   adjusting at least one air damper of an HVAC unit to allow a maximum of outside air to flow through the HVAC unit without circulating return air;
   establishing a fan speed of a fan of the HVAC unit for maximum outside airflow through the HVAC unit; and
   modifying the fan speed of the fan based on an occupant comfort criteria, the fan speed being modified, at least in part, based on a delta enthalpy of the HVAC unit and a nominal capacity of the HVAC unit, wherein modifying the fan speed of the fan includes:
     managing the fan speed, using an open loop logic, based on the delta enthalpy of the HVAC unit and the nominal capacity of the HVAC unit; and
     refining the fan speed, using a closed loop logic, based on at least one of a room temperature of the indoor area or a discharge air temperature of the HVAC unit.

14. The medium as described in claim 13, wherein establishing the fan speed of the fan of the HVAC unit includes driving the fan at a maximum fan speed.

15. The medium as described in claim 13, further comprising providing safety protection for the HVAC unit based on a high mixed/discharge temperature and a low mixed/discharge temperature, wherein the safety protection including a freeze protection mode for equipment safety.

16. The medium as described in claim 13, wherein modifying the fan speed of the fan includes purging contaminated viral air from the indoor area.

17. The medium as described in claim 13, wherein the delta enthalpy is based on a difference between a discharge air enthalpy of the HVAC unit and an outside air enthalpy of the HVAC unit.

* * * * *